United States Patent Office 2,799,715
Patented July 16, 1957

2,799,715
PREPARATION OF DIHYDRIC PHENOLS

Arthur D. Lohr and Milton A. Taves, Wilmington, Del., assignors to Hercules Powder Company, Wilmington, Del., a corporation of Delaware No Drawing. Application November 3, 1954,
Serial No. 466,656

7 Claims. (Cl. 260—628)

This invention relates to dihydric phenols and to the method of their preparation and more particularly to the method of preparation of dihydric phenols from $\alpha,\alpha$-dialkylmethylphenols.

It is well known that hydroperoxides are produced by the oxidation of $\alpha,\alpha$-dialkylmethylbenzenes in alkaline medium and that these hydroperoxides can be converted to phenols by acid catalyzed cleavage of the hydroperoxides. However, since the formation of hydroperoxides is prevented by the presence of traces of phenols, $\alpha,\alpha$-dialkylmethylphenols cannot be oxidized to the corresponding hydroperoxide by contacting the $\alpha,\alpha$-dialkylmethylphenol with oxygen in alkaline medium, thereby precluding any possibility of producing dihydric phenols by acid catalyzed cleavage of hydroperoxides of $\alpha,\alpha$-dialkylmethylphenols.

In accordance with the present invention it has now been found that dihydric phenols are prepared from difficultly hydrolyzable esters of $\alpha,\alpha$-dialkylmethylphenols by oxidizing the $\alpha,\alpha$-dialkylmethylphenyl ester to the corresponding $\alpha$-hydroperoxy-$\alpha,\alpha$-dialkylmethylphenyl ester, subjecting the hydroperoxy ester to acid catalyzed cleavage to the corresponding hydroxyphenyl ester and hydrolyzing the hydroxyphenyl ester to the dihydric phenol.

The process of this invention is expressed by the following chemical changes:

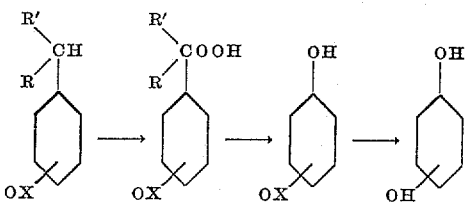

in which R and R' are lower alkyl groups having less than 4 carbon atoms and OX is a difficultly hydrolyzable ester group in the ortho, meta or para-position. The groups R and R' may thus be methyl, ethyl or propyl groups. The X of the OX group may be benzoyl, toluyl, naphthoyl, o-, m-, or p-phthaloyl, toluenesulfonyl, benzenesulfonyl naphthalenesulfonyl, pivaloyl, isobutyryl, or other difficulty hydrolyzable ester group. The position of substitution on the benzene ring is preferably meta or para in view of the greater ease of oxidation of the meta and para isomers.

The process of this invention is more particularly described with respect to the following examples in which all parts and percentages are by weight.

Example 1

Oxygen was bubbled at atmospheric pressure at a rate of 100 cc./min. through a mixture of 27 parts p-isopropylphenyl benzoate and 0.27 part calcium hydroxide. The reaction was maintained at 100° C. and was initiated with an ultraviolet lamp that was turned off after the formation of 0.4% hydroperoxide. Analysis of the product for active oxygen indicated that p-isopropylphenyl benzoate hydroperoxide formed at the following rate:

| Time (hours): | Percent hydroperoxide |
|---|---|
| 4 | 0.4 |
| 52 | 0.7 |
| 75 | 1.2 |
| 118 | 2.8 |
| 133 | 4.8 |
| 166 | 9.4 |
| 190 | 26.0 |
| 195 | 32.0 |

The average rate of oxidation including the induction period caused by the presence of a trace of p-isopropylphenol in the ester was 0.16% hydroperoxide per hour. The maximum rate after the induction period was 1.1% hydroperoxide per hour.

The 32% p-isopropylphenyl benzoate hydroperoxide was cleaved by adding a solution of 21.1 parts of the 32% hydroperoxide in 20 parts acetone to a refluxing mixture of 0.096 part sulfuric acid (1.5 weight percent, based on the hydroperoxide) and 20 parts acetone over a period of ten minutes. The hydroperoxide was completely decomposed in thirty minutes. The sulfuric acid catalyst was neutralized with sodium bicarbonate, the inorganic salts were filtered off, and the acetone was evaporated at reduced pressure. Recrystallization of the residue from a mixture of 300 parts hexane and 100 parts benzene gave 15 parts of recovered p-isopropylphenyl benzoate, M. P. 68–71° C., and 3.3 parts hydroquinone monobenzoate, M. P. 162–166° C. (62% of the theoretical yield of 5.3 parts). The melting point recorded in the literature for hydroquinone monobenzoate is 163° C. (Kehrmann, Sandoz, and Monnier, Helv. Chim. Acta 4, 943 (1921)).

The hydroquinone monobenzoate was then saponified by adding 2 parts hydroquinone monobenzoate to 50 parts ethanol, in which was dissolved 2 parts potassium hydroxide, and heating at 78–80° C. for 1 hour. The alcohol was removed by evaporation and the hydroquinone was precipitated from the residue by dissolving the residue in water and neutralizing to pH 5 with 10% aqueous sulfuric acid.

Example 2

Example 1 repeated with m-isopropylphenyl benzoate as the starting substance subjected to the oxidation yielded resorcinol in an amount about 55% of theoretical.

Example 3

Oxygen was bubbled through a mixture of 30 parts p-isopropylphenyl p-toluenesulfonate and 0.3 part calcium hydroxide according to the conditions of Example 1. p-Isopropylphenyl p-toluenesulfonate hydroperoxide formed at the following rate, as indicated by analyses for active oxygen.

| Time (hours): | Percent hydroperoxide |
|---|---|
| 5 | 0.5 |
| 23 | 0.8 |
| 30 | 1.2 |
| 46 | 2.6 |
| 54 | 4.1 |
| 70 | 9.8 |
| 78 | 14.6 |
| 85 | 19.2 |
| 103 | 31.7 |

The average oxidation rate was 0.3% hydroperoxide per hour and the maximum rate was 0.8% hydroperoxide per hour.

To a refluxing mixture of 50 parts acetone and 0.250 parts sulfuric acid (4.2 weight percent, based on the hydroperoxide) was added 19.5 parts of the 31.7% hydroperoxide over a period of ten minutes. The hydroperoxide was 92% decomposed after the mixture had refluxed for one hour and was assumed to be completely decomposed after two hours. The sulfuric acid catalyst was neutralized with 2 parts sodium bicarbonate, the inorganic salts were separated by filtration, and the acetone was evaporated at reduced pressure. The residue was recrystallized from 1000 parts hexane, and 3.9 parts hydroquinone mono-p-toluenesulfonate, M. P. 96–97° C., was obtained (76.5% of the theoretical yield). The melting point of this material was increased to 98.7–99.5° C. by recrystallization from hexane. The melting point recorded in the literature for hydroquinone mono-p-toluenesulfonate is 98–99° C. (Borsch and Frank, Ann. 450, 84).

The hydroquinone mono-p-toluenesulfonate was readily saponified by heating 10 parts of the ester with 300 parts 10% aqueous sodium hydroxide solution at 100° for one hour. Hydroquinone was recovered by acidifying the alkaline solution with 300 parts 10% hydrochloric acid.

*Example 4* p-Isopropylphenyl trimethyl acetate, prepared by heating trimethylacetyl chloride with p-isopropyl phenol and carefully purified, was heated to 100° C. and the liquified ester was contacted with a dispersion of oxygen for 24.5 hours at the end of which time the conversion to hydroperoxide amounted to 31.7%. The hydroperoxide was precipitated from a portion of the oxidized ester by adding hexane and cooling to 0° C. The p-isopropylphenyl trimethylacetate hydroperoxide was further purified by crystallization from hexane. The pure hydroperoxide melted at 83–83.5° C.

A sample of crude oxidate containing 31.7% hydroperoxide was cleaved by heating with twice its weight of acetone containing 0.5% sulfuric acid at about 60° C. for one hour. This treatment caused decomposition of all of the hydroperoxide. The monotrimethylacetate of hydroquinone was extracted from the cleavage mixture by distilling off the acetone and extracting with 5% sodium hydroxide. By acidification of the caustic extract hydroquinone monotrimethylacetate was recovered in 67.3% yield. The monotrimethylacetate of hydroquinone after crystallization from hexane melted at 100–101° C.

The monotrimethylacetate of hydroquinone on heating with 3 molecular equivalents of aqueous sodium hydroxide for one hour followed by acidification with 10% hydrochloric acid yielded hydroquinone in substantially theoretical amount.

The oxidation step for converting the ester of the $\alpha,\alpha$-dialkylmethylphenol to the hydroperoxide is carried out by intimately contacting the ester in the liquid state with an oxygen containing gas at a temperature in the range of about 20° C. to about 125° C. in the presence of an antacid. The preferred temperature of oxidation is in the range of about 70° C. to about 125° C.

The antacids used in the oxidation system are such that they prevent the presence of sufficient free acid to cause cleavage of the hydroperoxide group. The antacids in themselves do not promote sufficient alkalinity to cause saponification of the ester. Antacids satisfying the requirements of the present oxidation process are finely divided calcium and barium oxides and hydroxides, sodium and potassium bicarbonates and carbonates. They all effectively prevent acidity which catalyzes phenolic cleavage and also avoid saponification of the esters listed above.

The oxidation may be carried out in the presence or absence of water using any of these antacids. However, it is preferable to use a nonaqueous system in which water, other than traces formed in the oxidation system, is absent. When water is present, the antacid may be in solution or partly in suspension. When water is absent, the antacid is preferably finely divided and dispersed throughout the oxidation mixture.

While the oxidation process can be carried out with any of the esters listed above, the process is more broadly operable in general with any difficultly saponifiable ester. A difficultly saponifiable ester of an $\alpha,\alpha$-dialkylmethylphenol is defined as an ester of an $\alpha,\alpha$-dialkylmethylphenol and an organic acid which is not saponified by contact with small amounts, up to about 2% of the weight of the ester, of alkali earth metal oxides or hydroxides at temperatures in the range of 100° C. to 125° C. in the presence of steam.

The oxidation step is carried out as rapidly as possible and to this end dispersive devices for the oxygen are used along with rapid stirring. The oxidation is continued to as high a conversion as is possible or at least to a conversion in the range of 5 to about 40%.

If desired, the hydroperoxide can be separated from the $\alpha,\alpha$-dialkylmethylphenyl ester by caustic extraction in order to concentrate the hydroperoxide prior to cleavage. The hydroperoxide is readily liberated from the caustic solution by acidification with dilute mineral acid, and the hydroperoxide may then be cleaved in the manner described in the examples or by any of the known processes. The dihydric phenol monoester can be crystallized from the cleavage mixture when concentration of this ester is sufficiently high. The purified dihydric phenol monoester can then be subjected to saponification in which case further purification is simplified.

As an alternative to separating the hydroperoxide prior to cleavage, the whole oxidation mixture can be subjected to the cleavage reaction without prior separation of the hydroperoxide. In this case, after the oxidation has been carried to the desired degree, the oxidation mixture is contacted with an acid acting catalyst capable of cleaving the hydroperoxide group with the production of a ketone and a phenolic group. The cleavage may be carried out in an aqueous system or in a solvent such as acetone or other water-soluble ketone. Cleavage temperatures in the range of about 0° to about 150° C. may be used, but temperatures in the range of about 40° to about 80° C. are preferred. The cleavage catalysts effective in bringing about this well-known type of cleavage are operable in the present invention. They include such acid acting catalysts as sulfuric acid, aluminum chloride, zinc chloride, phosphoric acid, hydrochloric acid, acid clays, boron trifluoride and the like.

The cleavage mixture in this alternative cleavage process will contain a mixture of $\alpha,\alpha$-dialkylmethylphenyl ester and dihydric phenol monoester. The latter can be crystallized directly from the dialkylmethylphenyl ester of the cleavage mixture when the concentration is high and this crystallization can be facilitated by addition of an aliphatic hydrocarbon such as hexane.

The dihydric phenol monoester is saponified by heating with more than the theoretical amount of an alkali such as sodium or potassium hydroxide in aqueous solution. The caustic used is suitably an aqueous caustic of concentration in the range of 5 to about 30%. The temperature of saponification is suitably in the range of about 30° C. to about 130° C. A temperature of about 100° is particularly suitable. The dihydric phenol is precipitated by acidification. If desired the solution is concentrated prior to acidification and if necessary the dihydric phenol can be extracted with an organic solvent such as ether or methylene chloride.

Residual dihydric phenol monoester in the $\alpha,\alpha$-dialkylmethylphenyl ester is removed by extraction with dilute alkali such as aqueous sodium hydroxide of concentration in the range of 2% to 10%. The dihydric phenol monoester is completely removed by continued extraction with fresh alkali when the $\alpha,\alpha$-dialkylmethylphenyl ester is to be recycled to the oxidizer. Countercurrent extraction is preferably used so as to make as effective use of the alkali solution as possible. The dihydric phenol is then liberated from the alkali solution by acidification with mineral acid and the dihydric phenol can be extracted from the aqueous solution with ether or other organic solvents to remove any dihydric phenols that remain in solution.

If desired, the dihydric phenol ester extracted with caustic need not be removed from the caustic but can be saponified directly. In this case the saponification is accomplished by heating the caustic extract, and the product is worked up by acidification as described above.

The dihydric phenols can be further purified by azeotropic distillation using xylene, monochlorotoluene, monochloroxylene, monochlorobenzene, o-dichlorobenzene, 1,2,4-trichlorobenzene, or the like, as azeotrope former. They can also be further purified by crystallization.

The present process is a particularly useful method of converting α,α-dialkylmethylphenols formed as by-products in the cleavage of the hydroperoxide mixture resulting from oxidation of bis(α,α-dialkylmethyl) benzenes into more desirable end products. It is thus a useful process to be used in conjunction with the process of oxidizing bis(α,α-dialkylmethyl) benzenes into dihydric phenols by way of the cleavage of the dihydroperoxides. In this way the α,α-dialkylmethylphenol is not lost as a useless by-product.

The process of oxidizing difficultly oxidizable esters to hydroperoxy esters is disclosed and claimed in copending application Serial No. 466,657 of Milton A. Taves, filed November 3, 1954.

What we claim and desire to protect by Letters Patent is:

1. The method of producing a dihydric phenol of the group consisting of resorcinol and hydroquinone which comprises contacting a difficultly hydrolyzable ester of an α,α-dialkylmethylphenol, wherein the α,α-dialkylmethyl group is in one of the positions meta and para, with an oxygen containing gas at a temperature in the range of about 20° C. to about 125° C. in the presence of an antacid until there is formed the corresponding α-hydroperoxy-α,α-dialkylmethylphenyl ester, subsequently contacting said hydroperoxy ester with an acidic hydroperoxide cleavage catalyst until there is formed the hydroxyphenyl ester, and hydrolyzing the hydroxyphenyl ester to the corresponding dihydric phenol.

2. The method of producing a dihydric phenol of the group consisting of resorcinol and hydroquinone which comprises contacting a difficultly hydrolyzable ester of an isopropylphenol, wherein the isopropyl group is in one of the positions meta and para, with an oxygen containing gas at a temperature in the range of about 20° C. to about 125° C. in the presence of an antacid until there is formed the corresponding α-hydroperoxyisopropylphenyl ester, subsequently contacting said hydroperoxy ester with an acidic hydroperoxide cleavage catalyst until there is formed the hydroxyphenyl ester, and hydrolyzing the hydroxyphenyl ester to the corresponding dihydric phenol.

3. The method of producing a dihydric phenol of the group consisting of resorcinol and hydroquinone which comprises contacting an isopropylphenyl p-toluenesulfonate, in which the isopropyl group is in one of the positions meta and para, with an oxygen containing gas at a temperature in the range of about 20° C. to about 125° C. in the presence of an antacid until there is formed the corresponding α-hydroperoxyisopropylphenyl p-toluenesulfonate, subsequently contacting said hydroperoxy ester with an acidic hydroperoxide cleavage catalyst until there is formed the hydroxyphenyl ester and hydrolyzing the hydroxyphenyl ester to the corresponding dihydric phenol.

4. The method of producing a dihydric phenol of the group consisting of resorcinol and hydroquinone which comprises contacting an isopropylphenyl benzoate, in which the isopropyl group is in one of the positions meta and para, with an oxygen containing gas at a temperature in the range of about 20° C. to about 125° C. in the presence of an antacid until there is formed the corresponding α-hydroperoxyisopropylphenyl benzoate, subsequently contacting said hydroperoxy ester with an acidic hydroperoxide cleavage catalyst until there is formed the hydroxyphenyl ester and hydrolyzing the hydroxyphenyl ester to the corresponding dihydric phenol.

5. The method of producing a dihydric phenol of the group consisting of resorcinol and hydroquinone which comprises contacting an isopropylphenyl toluate, in which the isopropyl group is in one of the positions meta and para, with an oxygen containing gas at a temperature in the range of about 20° C. to about 125° C. in the presence of an antacid until there is formed the corresponding α-hydroperoxyisopropylphenyl toluate, subsequently contacting said hydroperoxy ester with an acidic hydroperoxide cleavage catalyst until there is formed the hydroxyphenyl ester and hydrolyzing the hydroxyphenyl ester to the corresponding dihydric phenol.

6. The method of producing resorcinol which comprises contacting a difficultly hydrolyzable ester of m-isopropylphenol with an oxygen containing gas at a temperature in the range of about 20° C. to about 125° C. in the presence of an antacid until there is formed the corresponding α-hydroperoxyisopropylphenyl ester, contacting said hydroxyperoxy ester with an acidic hydroperoxide cleavage catalyst until there is formed the corresponding hydroxyphenyl ester and hydrolyzing the hydroxyphenyl ester to resorcinol.

7. The method of producing hydroquinone which comprises contacting a difficultly hydrolyzable ester of p-isopropylphenol with an oxygen containing gas at a temperature in the range of about 20° C. to about 125° C. in the presence of an antacid until there is formed the corresponding α-hydroperoxyisopropylphenyl ester, contacting said hydroperoxy ester with an acidic hydroperoxide cleavage catalyst until there is formed the corresponding hydroxyphenyl ester and hydrolyzing the hydroxyphenyl ester to hydroquinone.

References Cited in the file of this patent

UNITED STATES PATENTS

| | | |
|---|---|---|
| 2,043,232 | Burroughs | June 9, 1936 |
| 2,118,141 | Bean | May 24, 1938 |
| 2,260,336 | Prescott et al. | Oct. 28, 1941 |
| 2,671,809 | Fortuin et al. | Mar. 9, 1954 |
| 2,683,751 | Filar | July 13, 1954 |

UNITED STATES PATENT OFFICE

CERTIFICATE OF CORRECTION

Patent No. 2,799,715

July 16, 1957

Arthur D. Lohr et al.

It is hereby certified that error appears in the printed specification of the above numbered patent requiring correction and that the said Letters Patent should read as corrected below.

Column 6, line 40, for "hydroxyperoxy" read --hydroperoxy--.

Signed and sealed this 24th day of September 1957.

(SEAL)
Attest:
KARL H. AXLINE
Attesting Officer

ROBERT C. WATSON
Commissioner of Patents